United States Patent [19]

Lala

[11] 4,110,238

[45] * Aug. 29, 1978

[54] REDUCED-STAINING COLORANT SYSTEM

[75] Inventor: Robert J. Lala, River Edge, N.J.

[73] Assignee: Lever Brothers Company, New York, N.Y.

[ * ] Notice: The portion of the term of this patent subsequent to May 25, 1993, has been disclaimed.

[21] Appl. No.: 655,346

[22] Filed: Feb. 5, 1976

Related U.S. Application Data

[62] Division of Ser. No. 574,487, May 5, 1975, Pat. No. 3,958,928.

[51] Int. Cl.$^2$ .................... C11D 3/42; C11D 3/40; C09B 1/28; C09B 1/32
[52] U.S. Cl. .................................. 252/89 B; 8/25; 8/77; 8/78; 8/137; 252/173; 252/525; 252/526; 252/544; 252/545; 252/559; 252/DIG. 14
[58] Field of Search ............... 8/25, 39, 77, 78, 137; 252/110, 117, 89 B, 525, 526, 544, 545, 173, DIG. 14

[56] References Cited

U.S. PATENT DOCUMENTS

| | | | |
|---|---|---|---|
| 2,121,928 | 6/1938 | Peter | 260/278 X |
| 2,930,760 | 3/1960 | Gebhardt | 252/110 |
| 3,123,565 | 3/1964 | Millsaps | 252/135 |
| 3,519,054 | 7/1970 | Cavataio | 252/110 X |
| 3,679,610 | 7/1972 | Sams | 252/529 |
| 3,748,093 | 7/1973 | Gangwisch | 8/77 X |
| 3,755,201 | 8/1973 | Trimmer | 252/526 |
| 3,958,928 | 5/1976 | Lala | 252/544 X |

FOREIGN PATENT DOCUMENTS 288,878  11/1915  Fed. Rep. of Germany ............... 8/39

*Primary Examiner*—Thomas J. Herbert, Jr.
*Attorney, Agent, or Firm*—James J. Farrell; Michael J. Kelly; Melvin H. Kurtz

[57] ABSTRACT

A dye composition is disclosed together with methods for its use and detergent compositions employing the combination. The dye composition is a mixture of anthraquinone dyes suitable for use with liquid laundry detergents. The composition substantially reduces the undesirable fabric staining characteristic of a detergent in which the dye is employed, while still retaining the ability to blue the fabric. Further, the color value of the detergent product is maintained at a desirable level. The composition is a combination of an oil soluble dye such as 1,4-bis(2-ethylhexylamino)-anthraquinone (C.I. Solvent Blue 58) with a water soluble dye such as 1-amino-2-sulfo, 4-(2-sulfo-para toluidino) anthraquinone sodium salt (C.I. Acid Blue 145) and/or 1,4-bis(3-sodium sulfonate mesitylidino) anthraquinone (C.I. Acid Blue 80).

3 Claims, No Drawings

REDUCED-STAINING COLORANT SYSTEM

This a division, of application Ser. No. 574,487, filed May 5, 1975, now U.S. Pat. No. 3,958,928.

This invention broadly relates to a combination of selected anthraquinone dyes for use in a liquid detergent composition. The combination exhibits a desirable color value coupled with reduced staining characteristics while still retaining the ability to impart a desirable bluing effect on fabrics contacted by the detergent.

Bluing compositions such as those disclosed in U.S. Pat. No. 3,755,201 are well known in the art as are liquid detergent compositions. For esthetic reasons a blue color imparted to a liquid laundry detergent has been found to be desirable and based on consumer testing, a blue product having a color value of a particular range is considered to be most acceptable. When producing such products it is especially helpful if the blue colorant added to the detergent composition not only imparts a desirable blue color to the product but also assists in bluing white fabrics which are contacted by the detergent either during washing or during pre-wash application for specific spot or stain removal. However, in attempting to achieve a desirable product color coupled with a bluing effect, marked undesirable staining of treated fabrics has been observed. The amount of staining has been found to correlate with the type of dye used, the fabric treated, specific adjuvants utilized with the detergent product and various substances that have come into contact with the fabric during its normal use.

Anionic dyes, for example, are found to be particularly susceptible to many common detergent additives. If the dye is changed to an oil soluble type and used in sufficient concentration to retain the desirable color value, the above problem can be eliminated for certain fabrics, for example, cotton. However, with synthetic fabrics, for example urethane based fabrics, the staining problem with the increased amount of oil soluble dye becomes considerable. Thus, the difficulty of producing an acceptably colored liquid detergent which retains a bluing capability and has reduced staining characteristics is apparent.

Since a large variety of synthetic fabrics including urethane based fabrics as well as many common additives to which anionic dyes are susceptible are currently employed in the consumer market, it is thus seen to be extremely desirable to produce a colored, esthetically pleasing liquid detergent product, which is usable in consumer oriented situations on common synthetic and natural fabrics.

Accordingly, it is an object of this invention to provide a combination of dyes for use with a liquid detergent composition which provides an esthetically pleasing product of a desirable color value; has the capacity to blue fabrics and has substantially reduced staining characteristics.

Another object is to overcome or substantially reduce the problems of the prior art heretofore described.

Other objects and advantages will appear as the description proceeds.

The attainment of the above objects is made possible by the utilization of a combination of selected anthraquinone dyes in a liquid detergent composition comprising about 0.006 to about 0.025% by weight of a dye mixture consisting essentially of about 0.0005% to about 0.0025% of 1,4-bis(2-ethylhexylamino)-anthraquinone and a water soluble anthraquinone dye selected from the group consisting of 1-amino-2-sulfo, 4-(2-sulfo-para toluidino) anthraquinone sodium salt; 1,4-bis (3-sodium sulfonate-mesitylidino) anthraquinone and mixtures thereof; about 5 to about 85% by weight of a synethic organic detergent and about 15 to about 95% by weight of compounds selected from the group consisting of builders, fillers, solvents and adjuvants.

By employment of the present invention, the above objects are achieved, together with the advantage that a pleasantly colored consumer acceptable liquid detergent composition can be utilized without substantial staining, in conjunction with common fabrics and common detergent additives.

Generally, the type of dyes used are a combination of two or more colorants with different staining characteristics each at a sufficiently reduced concentration to achieve some bluing while keeping staining at an acceptable level. A suitable combination is an anionic water soluble dye with an oil soluble dye. More specifically, a combination of

FORMULA I.

1,4-bis(2-ethylhexylamino)anthraquinone, C.I. Solvent Blue 58

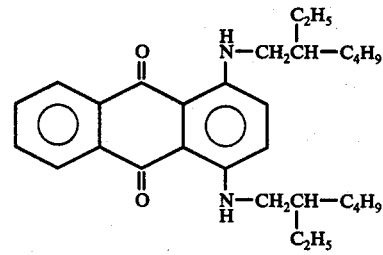

with either or both of

FORMULA II.

1-amino,2-sulfo,4-(2 sulfo-para toluidino) anthraquinone sodium salt, C.I. Acid Blue 145

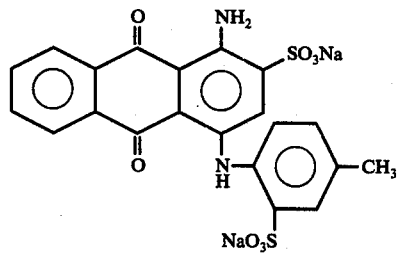

and

FORMULA III.
1,4-bis(3-sodium sulfonate mesitylidino) anthraquinone, C.I. Acid Blue 80

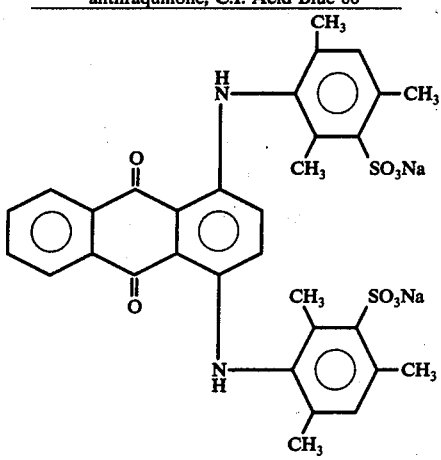

is used.

The total concentration of the dye combination utilized is generally governed by production of the required color value, together with the desirable bluing effect which effect is in turn produced by the oil soluble component (Formula I). The color value and bluing effects must be achieved without substantial staining of synthetic fabrics. Other considerations are stability, solubility, economics and compatability with detergent compositions.

Thus, the total amount of the combination of the dye of Formula I with either or both of the dyes of Formulae II and III is about 0.006% to about 0.025% by weight, preferably about 0.008% to about 0.012% by weight. The specific amounts of each which may be employed are considered hereinafter.

An additional factor to be considered in determining the proper total amount to produce a desired color value is whether the detergent is in the form of an emulsion or a solution. Emulsions, having a relatively opaque milky appearance, generally require more dye to produce a given color value than do solutions.

Broadly, the amounts of each of the individual components used are sufficient enough to provide a medium blue color value to a liquid detergent composition, to contribute some bluing effect to fabrics and not to visibly stain fabrics.

The preferred color value is initially determined by consumer preference tests. Based on data gathered from these tests, it is determined that a Gardner Reflectometer "b" reading of −5.0 to −15.0 is acceptable while a "b" reading of −7.0 to −10.0 is preferred. The range of color values are determined on a Gardner XL-10 CDM Reflectometer using a 2.0 "b" (i.e. yellow and blue range) standard plate.

The individual components of the combination are generally used in the following amounts:

Formula I from about 0.0005% to about 0.0030% by weight, preferably 0.0015% to 0.0025% by weight.

Formula II from about 0.005% to about 0.025% by weight, preferably about 0.006% to about 0.012% by weight.

Formula III from about 0.005% to about 0.025% by weight, preferably about 0.006% to about 0.012% by weight.

If the amounts of each employed is too low, then the color value of the products will be too low and if excess amounts are used, staining will result.

The weight ratio of Formula I to either or both of Formulae II and III, which is employed, is thus about 1 part by weight of Formula I to about 10 parts by weight of either or both of Formulae II and III to about 1 part by weight of Formula I to about 50 parts by weight of either or both of Formulae II and III.

The fabrics that may be treated with the compositions of this invention include those formed from all of the commonly used natural and synthetic fibers such as, for example, cottons, wools, silk, polyesters, linen, acetates, nylons, rayons, synthetic blends, and polyurethanes, such as spandex, as well as blends of natural and synthetic fibers such as cotton-polyester blends.

The detergent compositions which are used with the instant invention are liquid compositions either in emulsion or solution form, but can be extended to be included in formulations that take other forms as well, such as powders, bars, sticks, tablets, flakes, beads or other forms that are generally known in the detergent art. These detergents commonly contain at least one detergent active compound; a builder such as, for example, tetrasodium pyrophosphate, opacifiers, thickening agents and the like, various adjuvants, solvating agents and in the case of emulsified detergents, emulsifiers.

Particularly preferred compositions utilizing the dye combination of this invention are as follows:

| | |
|---|---|
| Nonionic detergent preferably an alcohol, ethylene oxide adduct having 8 to 15 carbon atoms and 7-12 E.O. groups | 0 to about 40% by wt. |
| Alkali metal or organic amine salts of alkyl aryl sulfonates | about 5 to about 20% by wt. |
| Builders | 0 to about 30% by wt. |
| Hydrotropes | about 3 to about 10% by wt. |
| Stabilizers | 0 to about 10% by wt. |
| Adjuvants | 0 to about 5% by wt. |
| Water | balance to 100% |

In detergent compositions, in which the mentioned dye mixtures are preferably employed, the active detersive ingredient is preferably a nonionic detergent. Preferred compositions of this type are also anionic detergents. Mixtures of such materials and amphoterics may also be used.

the nonionic synthetic organic detergents are usually condensation products of organic aliphatic or alkyl aromatic hydrophobic compounds and hydrophilic lower alkylene oxide groups. A wide variety of hydrophobic compounds which include carboxy, hydroxy, amido or amino groups having a free hydrogen on the nitrogen can be condensed, with a lower alkylene oxide or equivalent, such as ethylene oxide, polyethylene oxide, or polyethylene glycol to form the nonionic detergents. Useful hydrophobes are higher aliphatic alcohols, middle alkyl phenols, higher fatty acids, carboxamides, mercaptans and sulfonamides. The ethylene oxide condensates of such materials usually include from 5 to 50 moles of ethylene oxide but as many as 200 moles may often be present. The hydrophobic groups will generally contain at least about 6 carbon atoms but may contain as many 50. A preferred range is from about 8 to 30 carbon atoms in the hydrophobe. The ethylene oxide or the corresponding glycols or polyderivatives thereof are preferred but other lower alkylene oxides, such as propylene oxide, may also be of use and in some cases butylene oxide can be employed, generally in minor proportions. Other nonionic compounds include as active detersive ingredients are the polyoxyalkylene esters of higher fatty acids which will generally contain from 12 to 30 moles of ethylene oxide per mole of fatty acid of 10 to 22 carbon atoms. The alkylene oxide condensates of higher fatty acid amides are useful and these will usually have present from 10 to 50 moles of ethylene oxide per mole of 8 to 22 carbon atom fatty acid group. Corresponding carboxamides and sulfonamides are also useful. Oxyalkylated higher aliphatic alcohols are especially preferred nonionic compounds, utilizable in conjunction with the linear higher alkyl benzene sulfonate anionic detergents. The fatty alcohols will usually have from 10 to 18 carbon atoms and the polyxoyethylene group will contain from 6 to 30 moles of ethylene oxide, preferably from about 6 to 12 moles thereof when the alcohol is of 12 to 16 carbon atoms. Such nonionics are sold as Neodols by Shell Chemical Co.

Hydrophobic groups of the nonionics can be made by condensing polyoxypropylene or polyoxybutylene radicals, in which case the subsequent condensation with ethylene oxide or polyoxyethylene groups results in the production of a nonionic detergent such as those sold under the names Ucon and Pluronic. In the Pluronics the block copolymers made are of ethylene oxide, propylene oxide and some propylene glycol and have a molecular weight in the range of about 1,000 to 15,000. The polyethylene oxide content thereof will usually be from 20 to 80 percent by weight and the preferred hydrophobic moiety weight is from about 1,0000 to 4,000. Nonionics may be derived by the condensation of ethylene oxides with the reaction product of propylene oxide and ethylene diamine, in a manner similar to that employed for the preparation of the Pluronics. Various other nonionic detergents which may be used include the ethylene oxide adducts of monoesters of hexahydric alcohols and inner ethers thereof, with the higher fatty acids being of about 10 to 20 carbon atoms, e.g., sodium monolaurate, mannitan monopalmitate. Additional nonionic detergents that have been found to be very useful are the amine oxide of the general formula $R^1R^2R^3N\,O$, wherein $R^1$ is a higher alkyl of 10 to 20 carbon atoms and $R^2$ and $R^3$ are lower alkyls. Similar compounds wherein the nitrogen is replaced by phosphorus are also useable.

Although usually not employed in detergent compositions, amphoteric detergents are useful. These are generally water soluble salts of derivatives of aliphatic amines which contain at least one cationic group, e.g., quaternary ammonium, non-quaternary nitrogen or quaternary phosphonium, one or two alkyl groups of about 8 to 18 carbon atoms and an anionic water solubilizing carboxyl sulfo, sulfato, phosphato or phosphono group. The groups may be straight chained or branched and the cationic nitrogen or phosphorus may be in a heterocyclic ring. Examples of such amphoteric detergents include the alkyl beta-aminopropionates, the alkyl betaiminodipropionates, the alkyl and hydroxyalkyl taurinates and the long chain imidazole derivatives, such as those described in British Pat. No. 1,412,921 and U.S. Pat. Nos. 2,773,068, 2,781,354 and 2,781,357. Preferred detergents of this type are sodium N-lauryl beta-aminopropionate and disodium N-lauryl iminodipropionate.

The anionic detergents will normally contain from 8 to 26, preferably 10 to 20 carbon atoms in a higher organic organic hydrophobic group, and will have present at least one water-solubilizing radical selected from the group consisting of sulfonates, sulfates, carboxylates, phosphates and phosphonates, to produce a water soluble detergent. Examples of suitable anionic detergents are water soluble sulfated and sulfonated synthetic detergents containing an alkyl radical of 8 to 20, preferably 12 to 18 carbon atoms. Such radical may be a portion of a higher acyl group. Preferred examples of sulfonated anionic detergents are the higher alkyl aromatic sulfonates, such as the linear higher alkyl benzene sulfonates containing from 10 to 18 atoms in the higher alkyl group. Branched chain materials may also be used, but are not preferred. The sodium, potassium, ammonium and lower alkanolamine salts of such sulfonic acids are preferred. In some cases, higher alkyl toluene sulfonates and higher alkyl naphthalene sulfonates may be beneficially employed. Of the linear alkyl benzene sulfonates, those of 12 to 15 carbon atoms in the chain and wherein the salt forming cation is sodium are much preferred. These usually will be terminally or 2-substituted on the benzene ring. However, other points of joinder to the benzene may be employed and the main factor in producing a successful detergent of this type is to have the chain linear so as to promote biodegradability of the product.

Included among other anionic detergents which may be employed are the olefin sulfonates, e.g., long chain alkene sulfonates, long chain hydroxyalkane sulfonates and mixtures thereof. These are usually of 8 to 25 carbon atoms, preferably of 12 to 20 carbon atoms. Also useful are the paraffin-derived sulfonates containing about 10 to 20, preferably 15 to 20 carbon atoms. Examples of the primary paraffin sulfonates made by reaction of long chain alpha olefins with bisulfites and those compounds having the sulfonate group distributed along the paraffin chain. Sodium and potassium sulfates of higher alcohols containing 8 to 18 carbon atoms, such as sodium lauryl sulfate and sodium tallow alcohol sulfate may be employed, as may be the sodium and potassium salts of alpha-sulfofatty acid esters of 10 to 20 carbon atoms in the acyl group, e.g., methyl alpha-sulfomyristate and methyl alphasulfotallowate. The sodium and ammonium sulfates of mono- and diglycerides of higher fatty acids, e.g., coconut oil fatty acids monoglyceride monosulfate, stearic diglyceride monosulfate, are also useful, as are the sulfated condensation products of polyethyoxyethanols with fatty alcohols and the sulfonates of higher alkyl glycerol ethers. The alkyl phenyl polyethoxy ether sulfates having about 1 to 6 oxyethylene groups per molecule are useful anionic detergents when the alkyls are of about 7 to 9 carbon atoms. Such a range of carbon atoms is considered as "middle" alkyl. Other useful anionic detergents include the higher acyl sarcosides, isethionates and N-methyl taurides. These detergents, while normally used as their ammonium, alkanolamine, or alkali metal salts, may often be employed as soluble alkaline earth metal salts. The water soluble salts, e.g., the sodium, ammonium and alkanolamine salts, of higher fatty acids containing about 8 to 20 carbon atoms, preferably 10 to 18 carbon atoms, are good anionic detergents, too. The suitable fatty acids for making such soaps can be obtained from animal and vegetable oils, fats and waxes, e.g., tallow, grease, coconut oil, tall oil and various mixtures thereof. Preferred are the sodium soaps of the fatty acids derived from the mixture of coconut oil and tallow.

Cationic surface active agents are usually avoided in the present detergent compositions but may be employed when there are no anionics present or when a laundry treating composition is used primarily for its antibacterial activity. Examples of the cationic detergents are the normal primary amines wherein the alkyl group is of 12 to 15 carbon atoms, and the corresponding diamines. Quaternary ammonium compounds of the known type, preferably those having one or two higher alkyl groups and two or three lower alkyl groups attached to the nitrogen and wherein the solubilizing anion is a halogen are also useful, as are equivalent quaternaries of high anti-bacterial activity, which are well known in the art.

Detergent compositions in which the present dyes are incorporated may also have present builder salts, fillers, solvents and adjuvants. Typical of the builders that may be employed are the organic builder salts, such as carboxymethyloxysuccinic acid and other builders disclosed in U.S. Pat. No. 3,692,685; the inorganic builders such as the alkali metal polyphosphate salts, e.g., pentasodium tripolyphosphate, tetrasodium pyrophosphate and the corresponding potassium compounds. Other builders, especially popular in formulations low in phosphate content, are alkali metal silicates and carbonates, as well as the corresponding borates and bicarbonates. Preferably, the silicates will have an $Na_2O:SiO_2$ ratio of about 1:2.35, although the range of 1:2 to 1:3 is normally useful and often ratios as low as 1:3.2 are acceptable. Other organic builders that are employed are the citrates, diglycolates, gluconates, ethylene diamine tetraacetic acid, sodium salt and trisodium nitrilotriacetate. Of course, mixtures of builders may be used and they may be supplemented with fillers, which generally do not perform any significantly useful function with respect to increasing the detergency of the product. Among the fillers that are useful are the sulfates, chlorides, nitrates, and acetates, usually as their alkali metal salts, e.g., sodium sulfate. Solvents that may be employed will usually be primarily aqueous and any supplementing solvent material will generally be a lower alcohol, e.g., ethanol, isopropanol, or a polyol, e.g., polyethylene glycol, glycerol, if present at all. Of course, other organic solvent may be present, as in emulsions.

The various adjuvants that are used, in addition to the dye combination include germicides, fungicides, perborate bleaches, enzymes, soil suspending agents, fabric softeners, thickeners, corrosion inhibitors, sequestrants, tarnish inhibitors, perfumes and various other material intended to improve the functional and aesthetic properties of the detergents. Such materials are well known in the art and need not be described at length here. Perborate bleaches and enzymes, while not currently compatible with most aqueous system due to hydrolysis, may be applicable should problems in this area be resolved.

Among the additives for detergent compositions are materials which may be employed alone in other laundry preparations with the present dye mixtures. Soil suspending materials, e.g., sodium carboxymethyl cellulose, methyl cellulose and hydroxypropyl methyl cellulose may be in detergent or presoak compositions. Useful bactericidal effects may be obtained by adding germicides to the detergent or by utilizing these in separate treatments after washing has been completed. Fabric softening compositions may be employed in a similar manner.

Lengthy descriptions of additional softeners are not given herein because all such compounds may be colored with the present mixed dyes and descriptions thereof may be found in the reference, "Detergents and Emulsifiers" 1974 Annual, by J. W. McCutcheon. Of course, the fabric softeners and bactericides may also contain various adjuvants, such as those previously described.

In addition, if a detergent in the form of an emulsion is desired, this can be accomplished by incorporation of a stabilizer, as disclosed in U.S. Pat. Nos. 3,629,125 and 3,544,122, to maintain the active and builder components in the aqueous medium without allowing substantial phase separation.

The stabilizer preferred comprises a combination of a linear and a cross-linked copolymer of ethylene and maleic anhydride and is employed in the liquid detergent in an amount sufficient to provide both the desired stability and viscosity of the product. A suitable level of this combination of copolymers ranges from about 0.60% to about 0.9% by weight of the total composition.

Suitable linear copolymers of ethylene and maleic anhydride are available from the Monsanto Chemical Co. under the designations "EMA-21," "EMA-31," "EMA-4118", etc. Cross-linked copolymers are available under the designations "EMA-61," "EMA-71", "EMA-81," "EMA-91," and similar materials in this series. In general, the monomers are polymerized in a 1:1 ratio, the resins having molecular weights ranging from about 1500 and upwards. The cross-linked copolymers are generally cross-linked with a diamine, and alkylene polyamine, or a diolefinic material such as an ether, ester or a hydrocarbon, etc. Examples of polyamine cross-linking agents include diethylene triamine, triethylene tetramine, tetraethylene pentamine, and higher molecular weight polyethylene polyamines. Exemplary diolefinic cross-linking agents include divinyl benzene, diallyl ether, diallyl esters and the like. Other suitable cross-linking agents are set forth in U.S. Pat. Nos. 3,165,486 and 3,235,505 of Monsanto Company and include the preferred vinyl esters of olefinically unsaturated aliphatic carboxylic acids having from 3 to 24 carbon atoms, e.g., vinyl crotonate, vinyl linoleate, divinyl itaconate, vinyl acrylate and the like. The linear and cross-linked copolymers which have been successfully utilized in preparing formulations of this invention include the following:

|  | specific Viscosity* | Molecular weight |
|---|---|---|
| Linear resin: | | |
| EMA-21 | 0.6 | Intermediate. |
| EMA-31 | 1.0 | High. |
| EMA-4118 | 1.8 | Very high. |
|  | Viscosity in cps.** | |
| Cross-linked resin: | | |
| EMA-61 | 12,000 | |
| EMA-71 | 40,000 | |
| EMA-81 | 80,000 | |
| EMA-91 | 160,000 | |

*Determined on a 1% solution of the resin in dimethyl formamide at 25° C.
**Measurements made at 25° C on a 1% aqueous solution, adjusted to pH 9 with ammonium hydroxide, using a Brookfield viscometer, No. 6 spindle at 5 r.p.m.

The following Examples will more fully illustrate the embodiments of this invention. All parts, percentages and proportions referred to herein and in the appended claims are by weight unless otherwise indicated.

EXAMPLE 1

A liquid detergent is prepared having the following composition:

| | |
|---|---|
| Anionic Active | NaLAS 17% by weight |
| Nonionic Active | Neodol 25-9 7% by weight |
| Builder | Sodium Citrate Dihydrate, 10% by wt. |
| Hydrotrope | Sodium xylene sulfonate ⎫ 6% by wt.<br>sodium toluene sulfonate ⎭ ≈4:1 |
| Buffer | Monoethanolamine, 2% by wt. |
| Adjuvants | Cross-linked polystyrene copolymer<br>Latex opacifier, 0.05% by wt.<br>Anti-redeposition agent, methyl cellulose, 0.5% by wt.<br>Perfume, .15% by wt.<br>Fluorescent Dyes, .085% by wt. |
| Colorant | Formula I - 0.002% by wt.<br>Formula III - 0.0051% by wt. |
| Water | Balance to 100% |

1000 grams of the liquid detergent of the above formula is prepared in the following manner.

100 ml of demineralized water is introduced into a vessel. 0.051 grams of the dyestuff of Formula III and 5 grams of Methocel A-100 are added to the water with moderate stirring. The temperature is adjusted to 110°-120° F and this mixture is allowed to stir for approximately 1 hour. At the end of this time, the temperature is reduced to 65°-75° F. 141 grams of a 41.55% aqueous solution of sodium xylene sulfonate and sodium toluene sulfonate in a ratio of 4 parts xylene sulfonate to one part toluene sulfonate are added. 54 grams of a 50% aqueous solution of sodium hydroxide and 179.9 grams of 89% active linear dodecylbenzene sulfonic acid are then added to the solution vessel. A premix composition is prepared consisting of 70 grams of Neodol 25-9, 0.02 grams of the dyestuff of Formula I, 1.03 grams of fluorescent dyes, and 0.75 grams of stearic acid. The premix is then added to the solution in the vessel. 250 grams of a 40% aqueous solution of sodium citrate, dihydrate is added slowly, followed by 20 grams of monoethanolamine, 1.25 grams of a 40% solids content opacifying agent, and 1.5 grams of perfume. Demineralized water is added to 1000 grams ond the pH of the solution is adjusted with sodium hydroxide to 11.2±0.2. Moderate mixing is maintained throughout all additions.

EXAMPLE II

An emulsified liquid detergent is prepared with the following composition:

| | |
|---|---|
| Nonionic Active | Neodol 25-9 8% by weight |
| Builder | Tetrapotassium/tetrasodium pyrophosphate 8.05/1 25% |
| Hydrotrope | Sodium xylene sulfonate ⎫ 2% by wt.<br>Sodium toluene sulfonate ⎭ ≈4:1 |
| Buffer | NaSilicate 2.4 ratio 3% by wt. |
| Adjuvants | Stabilizing resin ethylene maleic anhydride copolymer .8%<br>Perfume, 0.1%<br>Fluorescent Dyes, 0.1% |
| Colorant | Formula I - 0.002<br>Formula II - 0.005<br>Formula III - 0.006 |
| Water | Balance to 100% |

1000 grams of the above formulation is prepared in the following manner.

200 ml of water and 48 grams of a 41.55% aqueous solution of sodium xylene sulfonate and sodium toluene sulfonate in a ratio of 4 parts xylene sulfonate to 1 part toluene sulfonate are introduced into a vessel and maintained with vigorous high shear mixing. A first premix is prepared containing 80 grams of Neodol 25-9, 0.02 grams of the dyestuff of Formula I and 0.5 grams of a fluorescent dye. This premix is added to the mixing solution in the vessel. The pH of this mixture is maintained at less than 3 and the temperature is adjusted to 170° F.

2.0 grams of EMA-21 and 6.0 grams of EMA-61, both of which are trademarks for ethylene maleic anhydride copolymers marked by Monsanto Chemical Company, are added and the mixture is then allowed to hydrate for one hour at 170° F under vigorous mixing. 18 grams of a 45.5% aqueous solution of potassium hydroxide and 441.8 grams of a 56.6% aqueous solution of an 8.05 to 1 mixture of tetrapotassium pyrophosphate and tetrasodium pyrophosphate is added.

64 grams of 48% aqueous solution of 2.4 to 1 ratio $Na_2O$ to $SiO_2$ sodium silicate and 5 grams of sodium carboxymethylcellulose thickening agent is then added. A second premix is prepared containing 0.76 grams of a fluorescent dye, 0.5 grams of potassium hydroxide and 10 ml of water. This second premix is added together with 0.05 grams of the dyestuff of Formula II and 0.06 grams of the dyestuff of Formula III. 1.0 grams of perfume and a sufficient amount of water to make 1000 grams are then added and the pH is adjusted as necessary with potassium hydroxide to 11.9±0.2. Vigorous high shear mixing and a temperature of 170° F is maintained.

Throughout the preparation and when the preparation is complete, the mixture is passed through a homogenizer as 1700 to 2000 P.S.I. to prepare the final emulsion.

EXAMPLE III

A liquid detergent is prepared having the following composition:

| | |
|---|---|
| Nonionic Active | Neodol 25-9 8% by weight |
| Builder | Sodium citrate dihydrate, 20% |
| Hydrotrope | Sodium xylene sulfonate ⎫ 2% by wt.<br>Sodium toluene sulfonate ⎭ ≈4:1 |
| Buffer | NaSilicate 2.4 ratio, 10% by wt. |
| Adjuvants | Stabilizing resin ethylene maleic anhydride copolymer, 85%<br>Perfume, 0.1%<br>Fluorescent Dyes, 0.1% |
| Colorant | Formula I - 0.003<br>Formula II - 0.008 |
| Water | Balance to 100% |

The composition of Example III is prepared in exactly the same manner as that of Example II, except that the phosphate builder is replaced by a citrate builder, the silicate level is increased and varying amounts of the other components are employed.

EXAMPLE IV

A series of products were prepared as in Example II utilizing various combinations of the dyes of this invention as well as control products. The products are subjected to two tests, an overnight soak test and a sandwich staining test which are described as follows.

OVERNIGHT SOAK TEST

The overnight soak test is run by taking 4 liquid ounces of the product, dissolving it in one gallon of demineralized water and allowing swatches of various fabrics to soak overnight at room temperature in the solution. The following day the switches are rinsed in a washing machine on a rinse cycle for roughly 15 minutes, dried for about 2 hours and subsequently evaluated. The temperature used for washing is 120° F.

SANDWICH STAINING TEST

The sandwich staining test is utilized to determine whether intimate contact of a detergent with a fabric will cause staining. This is especially significant if the detergent is utilized for pre-treatment of spots or stains. The liquid detergent is placed dropwise onto a dry swatch of fabric, the product is allowed to penetrate the swatch for about 5 minutes and then folded and allowed to stand overnight. The swatch is unfolded, the excess product removed by blotting and the swatch is washed in tap water with the product at the recommended use level. The temperature used is 120° F.

A series of fabrics are utilized for this test ranging from cotton cloth to synthetics and synthetic blends.

The specific dye combinations utilized are presented in Table I and the results of the tests performed are presented in Table II. The evaluation is done visually using numerical values of 0, 2, 4, 6 and 8. O is representative of no staining and 8 is representative of considerable staining.

TABLE I
DYE COMBINATIONS USED FOR TESTING AS REPORTED IN TABLE II

| Colorant System | | | | | |
|---|---|---|---|---|---|
| 1 | Formula I | 0.007% | (Control) | | |
| 2 | Formula II | 0.0165% | (Control) | | |
| 3 | Formula III | 0.02% | (Control) | | |
| 4 | Formula I | 0.003% | Formula III | 0.01% | |
| 5 | Formula I | 0.003% | Formula II | 0.008% | |
| 6 | Formula II | 0.008% | Formula III | 0.01% (Control) | |
| 7 | Formula I | 0.002% | Formula II | 0.005% | |
|  | Formula III | 0.006% | | | |
| 8 | Formula I | 0.002% | Formula III | 0.012% | |
| 9 | Formula I | 0.002% | Formula III | 0.008% | |
| 10 | Formula I | 0.002% | Formula III | 0.016% | |
| 11 | Formula I | 0.002% | Formula III | 0.02% | |

TABLE II
SANDWICH AND OVERNIGHT SOAK TESTS

Colorant System
Sandwich Staining Test

| Material | 1 | 2 | 3 | 4 | 5 | 6 | 7 | 8 | 9 | 10 | 11 |
|---|---|---|---|---|---|---|---|---|---|---|---|
| Terry | 0 | 0 | 0 | 0 | 0 | 0 | 0 | 0 | 0 | 4 | 0 |
| Spandex | 2 | 0 | 0 | 0 | 0 | 0 | 0 | 2 | 0 | 0 | 0 |
| Wool | 0 | 0 | 0 | 0 | 0 | 0 | 0 | 0 | 0 | 0 | 0 |
| Spun Nylon | 2 | 0 | 0 | 0 | 0 | 0 | 0 | 0 | 0 | 0 | 0 |
| Banlon | 2 | 0 | 0 | 0 | 0 | 0 | 0 | 0 | 0 | 0 | 0 |
| Wool Flannel | 0 | 0 | 0 | 0 | 0 | 0 | 0 | 0 | 0 | 0 | 0 |

Colorant System
Overnight Soak Tests

| Material | 1 | 2 | 3 | 4 | 5 | 6 | 7 | 8 | 9 | 10 | 11 |
|---|---|---|---|---|---|---|---|---|---|---|---|
| Terry | 0 | 0 | 0 | 0 | 0 | 0 | 0 | 0 | 0 | 4 | 0 |
| Spandex | 6 | 0 | 0 | 2 | 2 | 0 | 0 | 2 | 0 | 0 | 0 |
| Wool | 0 | 4 | 0 | 0 | 2 | 0 | 0 | 0 | 0 | 0 | 0 |
| Spun Nylon | 4 | 0 | 0 | 0 | 0 | 2 | 0 | 0 | 0 | 0 | 0 |
| Banlon | 2 | 0 | 0 | 0 | 2 | 0 | 0 | 0 | 0 | 0 | 0 |
| Wool Flannel | 0 | 4 | 0 | 0 | 2 | 0 | 0 | 0 | 0 | 0 | 0 |

As a result of the tests reported in Table II, it can be seen that the combination of dyes of this invention, i.e. the dye of Formula I together with either or both of the dyes of Formulae II and III provide significantly less staining on fabric.

EXAMPLE V

The preferred color value of the products of this invention is determined by consumer preference testing of color values and then correlation of these preference tests with a numerical scale on a Reflectometer.

A Gardner XL-10 CDM Reflectometer is used and "$b$" (i.e. yellow and blue) readings are taken. A 250 ml beaker is placed over the light source and a 2.0 "$b$" standard plate is placed over the mouth of the beaker. The reading of the Reflectometer is then set at 0.0 corresponding to the standard, for convenience. A sufficient amount of product, 100 drops, to cover the bottom of the beaker is then added. The standard plate is again placed over the mouth of the beaker and the "$b$" reading is taken. Results of these tests are reported in Table III. The more negative values represent a deeper blue.

TABLE III
REFLECTOMETER COLOR VALUE READINGS

| Colorant System | Test 1 | Test 2 | Test 3 | Mean |
|---|---|---|---|---|
| No colorant (Control) | 8.8 | 9.9 | 9.2 | 9.3 |
| .0035% Formula I | −2.7 | −1.6 | −2.7 | −2.3 |
| .007% Formula I | −8.5 | −8.7 | −9.2 | −8.8 |
| .002/.02% Formula I/ Formula III | −11.8 | −12.8 | −11.6 | −12.1 |

These values are taken from an emulsified detergent and therefore required relatively greater amounts of dye to achieve an acceptable color value. A detergent which is a solution requires correspondingly less dye.

EXAMPLE VI

The bluing effect of the dye combination of this invention is determined in comparison with an uncolored product and with each of the dyes of the combination used separately. This comparison is accomplished by preparing a composition as in Example II and incorporating varying amounts of the dyestuff combinations of this invention therein and by preparing control formulations as in Example II which contain no colorant and each of the dyes of Formulae I, II and III, respectively.

The liquid detergent compositions are prepared as in Example II and varying amounts of colorants are incorporated therein as specified in Tables IV and V.

26.25 grams of the formulation is added to three gallons of deionized water at 120° F in a stainless steel tub containing a mechanical agitator, similar to that in a commercial washing machine. The water and formulation are agitated for one minute to achieve complete dispersion of the composition.

A series of 12 inch × 12 inch swatches of different fabric are added as follows:
 a) Cotton Shirting TF 429*
 b) Cotton Toweling (Startex)
 c) Nylon Taffeta TF 302A*
 d) Spun Dacron TF 754 AW*
 e) Polyester Double Knit TF 720*
 f) 65/35 Dacron/Cotton blend with a Permanent Press Finish TF 7406 WRL*.

The load is then made up to 16 ounces with cotton sheeting TF 400*.

*These fabrics and their numerical designations are standard fabrics sold by Test Fabrics Inc. and fully described in a catalog available from the company.

The load of swatches in the tub is agitated for 15 minutes. The rub is then drained and the load is rinsed with agitation for 3 minutes. The washing rinsing cycle is carried out 5 times and the swatches are hand squeezed between each wash and rinse and at the end of each rinse. The fabric swatches are then ironed and their blue-yellow reflectance measured on a Gardner XL-10 CDM Reflectometer using a "b" reading. The Reflectometer is standardized by using a Gardner standard plate with a "b" value of +0.2.

The results of the tests are reported in Tables IV and V where the more negative values indicate greater bluing effect.

TABLE IV
BLUING TESTS
"b" Values - 5 Washes

| Product | Cotton Startex | TF302A Nylon | TF754AW Spun Dacron |
|---|---|---|---|
| 1. 0.002%/0.008% Formula I/Formula III | +3.1 | +2.3 | +3.1 |
| 2. 0.002%/0.02% Formula I/Formula III | +3.2 | +3.1 | +3.2 |
| 3. 0.007% - Formula I (Control) | +3.0 | +1.2 | +1.5 |
| 4. No Colorant | +3.7 | +4.2 | +3.9 |

| Product | TF429 Cotton Shirting | TF7406WRL Dacron/Cotton Blend | TF720 Polyester Double Knit |
|---|---|---|---|
| 1. 0.002%/0.008% Formula I/Formula III | +2.2 | +3.1 | +3.3 |
| 2. 0.002%/0.02% Formula I/Formula III | +2.6 | +3.1 | +3.4 |
| 3. 0.007% Formula I (Control) | +2.6 | +0.6 | +2.3 |
| 4. No Colorant | +2.9 | +3.6 | +3.9 |

TABLE V
BLUING TEST
"b" Values - 5 Washes

| Product | Cotton Startex | TF302A Nylon | TF754AW Spun Dacron | TF429 Cotton Shirting | TF7406WRL Dacron/Cotton Blend | TF720 Polyester Double Knit |
|---|---|---|---|---|---|---|
| Formula II - 0.165% (Control) | +3.1 | +3.8 | +2.7 | +2.6 | +3.9 | +3.7 |
| Formula III - 0.02% (Control) | +2.8 | +4.7 | +2.7 | +3.2 | +3.7 | +3.8 |
| Formula I - 0.002%/Formula II - 0.005% Formula III - 0.006 | +3.0 | +3.8 | +2.1 | +2.8 | +2.9 | +3.5 |
| Formula I - 0.003%/Formula II - 0.008% | +3.1 | +3.1 | +1.9 | +2.4 | +2.4 | +3.3 |
| No Colorant (Control) | +3.2 | +4.4 | +2.6 | +2.5 | +3.7 | +3.7 |
| Formula I - 0.007% (Control) | +2.9 | +2.7 | +1.1 | +2.6 | +1.7 | +3.0 |

The results of the tests performed in Example VI and reported in Tables IV and V clearly show that the dye combination of this invention retains a bluing effect in comparison to an uncolored product or a product incorporating only the dye of Formula I. A comparison of the color value, staining, and bluing characteristics of the dye mixture of this invention with the color value, staining and bluing characteristics of the dye of Formula I alone shows that the dye mixture of the invention has a desirable color value, retains a bluing capacity but has substantially reduced staining characteristics.

In view of the preceeding description and examples, various modifications thereof will be suggested to those skilled in the art and are to be included within the spirit and purview of this application and the scope of the appended claims.

What is claimed is:

1. A method for producing a synthetic liquid detergent having a Gardner Reflectometer "b" color value of about −5 to −15 whereby said liquid detergent exhibits reduced staining characteristics while still retaining the ability to impart bluing to fabrics comprising admixing with said detergent a sufficient amount to produce said color value of a dye mixture consisting essentially of about 0.0005% to about 0.0030% by weight of 1,4-bis (2 ethylhexylamino)anthraquinone and at least one water soluble anthraquinone dye selected from the group consisting of 1-amino-2-sulfo, 4-(2-sulfo-para toluidino) anthraquinone sodium salt, 1,4-bis(3-sodium sulfonate-mesitylidino)anthraquinone and mixtures thereof.

2. A method as defined in claim 1 wherein said dye mixture is present in an amount of about 0.008% to about 0.012% by weight, said dye mixture consisting essentially of about 0.0015% to about 0.0025% by weight of 1,4-bis(2-ethyl-hexylamino) anthraquinone and at least one water soluble anthraquinone dye selected from the group consisting of about 0.005% to about 0.025% by weight of 1-amino-2-sulfo, 4-(2-sulfopara toluidino) anthraquinone sodium salt, about 0.005% to about 0.025% by weight of 1,4-bis(3-sodium sulfonate-mesitylidino) anthraquinone and mixtures thereof.

3. A method as defined in claim 1 wherein said dye mixture is 0.002% by weight of 1,4-bis(2-ethylhexylamino) anthraquinone and 0.005% by weight of 1,4-bis(3-sodium sulfonate-mesitylidino) anthraquinone.

* * * * *